(12) United States Patent
Rickis et al.

(10) Patent No.: US 9,347,575 B2
(45) Date of Patent: May 24, 2016

(54) HIGH PRESSURE RELIEF VALVE FLOW DISRUPTOR

(71) Applicant: Hamilton Sundstrand Corporation, Charlotte, NC (US)

(72) Inventors: Aaron F. Rickis, Feeding Hills, MA (US); Francis P. Marocchini, Somers, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 60 days.

(21) Appl. No.: 14/247,750

(22) Filed: Apr. 8, 2014

(65) Prior Publication Data
US 2015/0285391 A1  Oct. 8, 2015

(51) Int. Cl.
*F16K 11/07* (2006.01)
*F02C 7/232* (2006.01)
*F16K 17/04* (2006.01)

(52) U.S. Cl.
CPC ............. *F16K 17/0433* (2013.01); *F02C 7/232* (2013.01); *F16K 11/07* (2013.01); *Y10T 137/0497* (2015.04); *Y10T 137/7739* (2015.04)

(58) Field of Classification Search
CPC .... G05D 7/0682; G05D 7/0635; F02C 7/232; F16K 11/07; Y10T 137/0497; Y10T 137/7793
USPC ............ 137/469, 625.28, 625.3, 625.33, 536, 137/543.19
See application file for complete search history.

(56) References Cited

U.S. PATENT DOCUMENTS

| | | | |
|---|---|---|---|
| 4,873,817 A | 10/1989 | Harms | |
| 5,383,489 A * | 1/1995 | Golestan et al. | ............... 137/504 |
| 6,241,473 B1 | 6/2001 | Soule et al. | |
| 7,152,628 B2 * | 12/2006 | Folk et al. | ................ 137/625.33 |
| 2011/0284092 A1 | 11/2011 | Spencer et al. | |
| 2012/0286181 A1 | 11/2012 | Labrie et al. | |

OTHER PUBLICATIONS

GB Search report regarding related GB Application No. GB1505616.1; Dated May 13, 2015; 3 pages.

* cited by examiner

*Primary Examiner* — Mary McManmon
*Assistant Examiner* — Patrick Williams
(74) *Attorney, Agent, or Firm* — Cantor Colburn LLP

(57) ABSTRACT

In one aspect, a fluid flow disruptor is provided. The fluid flow disruptor includes a base flange having an outer diameter and an inner diameter, the base flange configured to couple to a valve, and a cap extending from the base flange. The cap includes a proximal end coupled to the base flange about the inner diameter, a distal end, and a sidewall extending between the proximal end and the distal end. At least one aperture is formed in the sidewall, and the fluid flow disruptor is configured to direct a fluid flowing in an axial direction to flow around the cap distal end, through the at least one aperture, and through the base flange inner diameter into the valve, to thereby increase a turbulence of the fluid to decrease an axial momentum load of the fluid acting on the valve.

7 Claims, 3 Drawing Sheets

HIGH PRESSURE RELIEF VALVE FLOW DISRUPTOR

BACKGROUND OF THE INVENTION

This disclosure generally relates to fluid flow disruptors, and more particularly, to fluid flow disruptors for pressure relief valves.

Typically, a pressure relief valve is used to control or limit pressure buildup in a fluid transporting system. The pressure may be relieved by allowing the pressurized fluid to flow through the pressure relief valve to another portion of the system or even out of the system. The pressure relief valve may be designed or set to open at a predetermined set pressure to protect pressure vessels and other equipment from being subjected to pressures that exceed their design limits.

Although the pressure relief valve may open at the predetermined set pressure, the valve may experience a negative droop, which may cause the valve to open further when subjected to a pressure less than the set pressure. The negative droop may be caused at least in part by fluid momentum forces acting on the valve. As such, the negative droop may force the valve into a full open position and prevent the valve from regulating fluid flow as designed.

BRIEF DESCRIPTION OF THE INVENTION

In one aspect, a fluid flow disruptor is provided. The fluid flow disruptor includes a base flange having an outer diameter and an inner diameter, the base flange configured to couple to a valve, and a cap extending from the base flange. The cap includes a proximal end coupled to the base flange about the inner diameter, a distal end, and a sidewall extending between the proximal end and the distal end. At least one aperture is formed in the sidewall, and the fluid flow disruptor is configured to direct a fluid flowing in an axial direction to flow around the cap distal end, through the at least one aperture, and through the base flange inner diameter into the valve, to thereby increase a turbulence of the fluid to decrease an axial momentum load of the fluid acting on the valve.

In another aspect, a pressure relief valve assembly is provided. The assembly includes a pressure relief valve configured to couple to a fluid line, and a fluid flow disruptor coupled to the pressure relief valve. The fluid flow disruptor includes a base flange having an outer diameter and an inner diameter, the base flange coupled to the pressure relief valve, and a cap extending from the base flange. The cap includes a proximal end coupled to the base flange about the inner diameter, a distal end, and a sidewall extending between the proximal end and the distal end. The at least one aperture is formed in the sidewall, and the fluid flow disruptor is configured to direct a fluid flowing in an axial direction of the fluid line around the cap distal end, through the at least one aperture, and through the base flange inner diameter into the valve, to thereby increase a turbulence of the fluid to decrease an axial momentum load of the fluid acting on the valve.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Described herein is a flow disruptor for a valve or other fluid flowing device. The flow disruptor changes the direction of an axially flowing fluid by forcing the fluid around components of the disruptor. This altered flow increases fluid turbulence, which results in the fluid flowing in a non-axial direction (e.g., increased fluid tangential velocity), which reduces fluid momentum forces in the axial direction that act on a valve downstream of the fluid flow disruptor.

Figure 1:
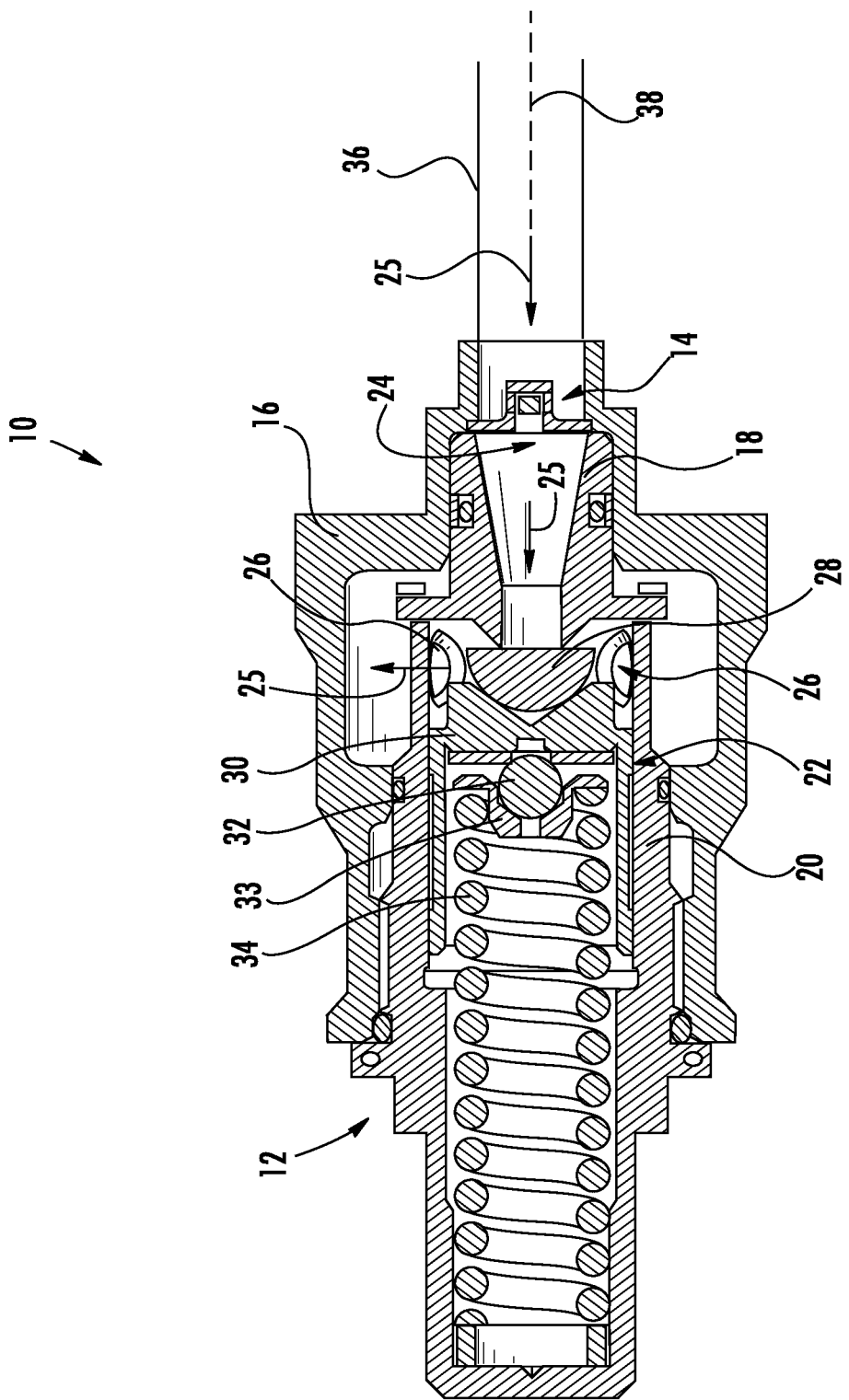
FIG. 1 is a cross-sectional view of a valve assembly.
Figure 2:
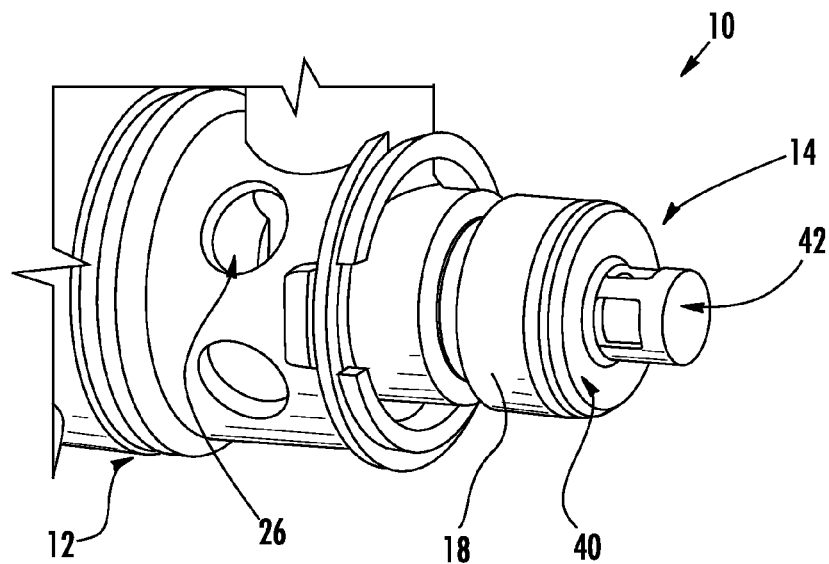
FIG. 2 is a perspective view of a portion of the valve assembly shown in FIG. 1.

FIGS. 1 and 2 illustrate an valve assembly 10 that includes a pressure relief valve (PRV) 12 and a flow disruptor 14. As shown in FIG. 1, valve assembly 10 may be arranged in a housing 16 with other valves (not shown). Although described herein in combination with a pressure relief valve, flow disruptor 14 may be coupled to various other fluid flowing devices. Moreover, PRV 12 is merely an example relief valve, and PRV 12 may have any suitable structure that enables assembly 10 to function as described herein.

PRV 12 allows for a fluid within a system to be relieved by operation PRV 12 when the fluidic pressure of the fluid exceeds a predetermined threshold. In the illustrated embodiment, PRV 12 generally includes a nozzle 18, a sleeve 20, and a spring assembly 22. Nozzle 18 is coupled to sleeve 20, which houses spring assembly 22.

PRV 12 includes an inlet port 24 formed in nozzle 18 and one or more outlet ports 26 formed in sleeve 20. Inlet port 24 receives a fluid 25 and directs fluid 25 to and through outlet ports 26 in order to relieve a pressure within a system. For example, PRV 12 may be fluid communication with a fluid line 36 of a conduit system (not shown) and may be used to control or limit a pressure buildup in the conduit system.

Spring assembly 22 includes a half ball 28, a spool 30, a ball 32, a spring seat 33, and a spring 34. Half ball 28 is seated against nozzle 18 due to force exerted by spring 34. At a predetermined pressure, spring 34 is compressed, and half ball 28 is moved axial in away from nozzle 18, which allows fluid 25 to pass half ball 28 and flow through outlet ports 26. As such, system pressure is relieved through operation of PRV 12 by allowing the pressurized fluid 25 to flow from inlet port 24 through outlet ports 26 at a predetermined pressure.

Figure 3:
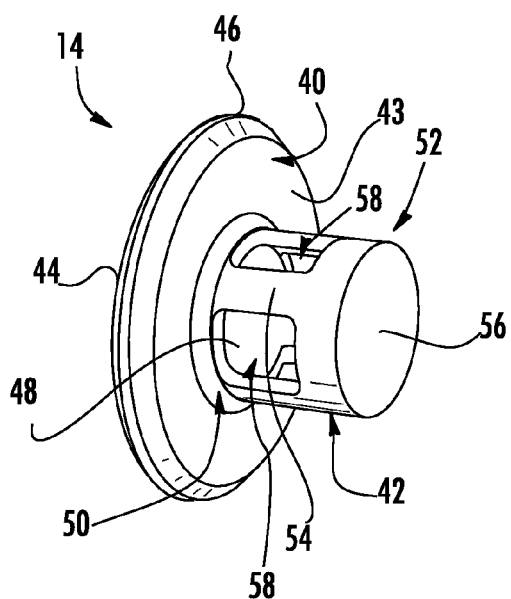
FIG. 3 is an enlarged perspective view of a flow disruptor of the valve assembly shown in FIGS. 1 and 2.
Figure 4:
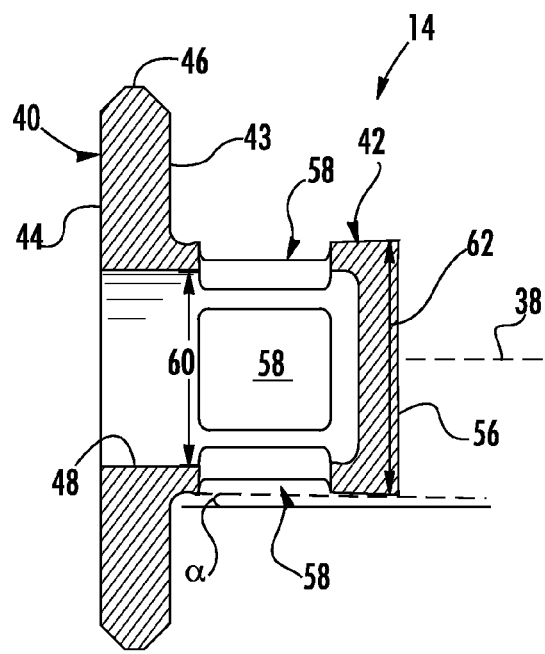
FIG. 4 is a cross-sectional view of the flow disruptor shown in FIG. 3 and taken along line 4-4.

FIGS. 3 and 4 illustrate flow disruptor 14 in more detail. In illustrated embodiment, flow disruptor 14 is coupled to nozzle 18 and generally includes a base flange 40 and a cap 42 extending therefrom. Base flange 40 includes an upstream face 43 and a downstream face 44 that is configured to couple to nozzle 18. Base flange 40 is generally circular and includes an outer diameter 46 and an inner diameter 48 that allows fluid 25 to flow into nozzle 18. However, base flange 40 may have any suitable shape that enables flow disruptor 14 to function as described herein.

Cap 42 includes a proximal end 50, a distal end 52, and a sidewall 54 extending therebetween. Proximal end 50 is coupled to base flange upstream face 43 about inner diameter 48, and distal end 52 includes a solid surface 56. A plurality of windows or apertures 58 are formed in sidewall 54 to allow fluid 25 to flow from fluid line 36 (FIG. 1) into nozzle 18. Although cap 42 is illustrated with four apertures 58, cap 42 may have any number of apertures 58 that enables disruptor 14 to function as described herein. For example, cap 42 may have one or three apertures 58.

In the illustrated embodiment, between proximal end 50 and distal end 52, sidewall 54 is oriented at an angle 'α' relative to a longitudinal axis 38 of fluid line 36. In one embodiment, angle 'α' is between approximately 1° and 5°. In another embodiment, angle 'α' is between approximately 2° and 4°. In yet another embodiment, angle 'α' is approximately 3°. Alternatively, angle 'α' may be any suitable acute angle with respect to axis 38 that enables disruptor 14 to function as described herein.

In the illustrated embodiment, cap 42 is a hollow, generally cylindrical member. As such, due to angled sidewall 54, proximal end 50 has a diameter 60 that is smaller than a diameter 62 of distal end 52. However, cap 42 may have any suitable shape that enables disruptor 14 to function as described herein. For example, cap 42 may be generally rectangular. Further, in the illustrated embodiment, solid surface 56 is flat and is oriented substantially perpendicular to fluid line axis 38. Alternatively, surface 56 may have other suitable shapes and angular orientations to axis 38 that enables disruptor 14 to function as described herein.

During operation of some known PRV's, a fluid pressure load may exceed the "cracking" or opening set pressure of the PRV. The fluid passing through the opened PRV may be flowing substantially in an axial direction such that the fluid has high fluid momentum loads in the axial direction. These axial fluid momentum loads may cause the valve to remain open with lower fluid pressure than the set pressure, which is described herein as negative droop. Flow disruptor 14 facilitates reducing these axial fluid momentum loads, thereby reducing negative droop on PRV 12.

Figure 5:
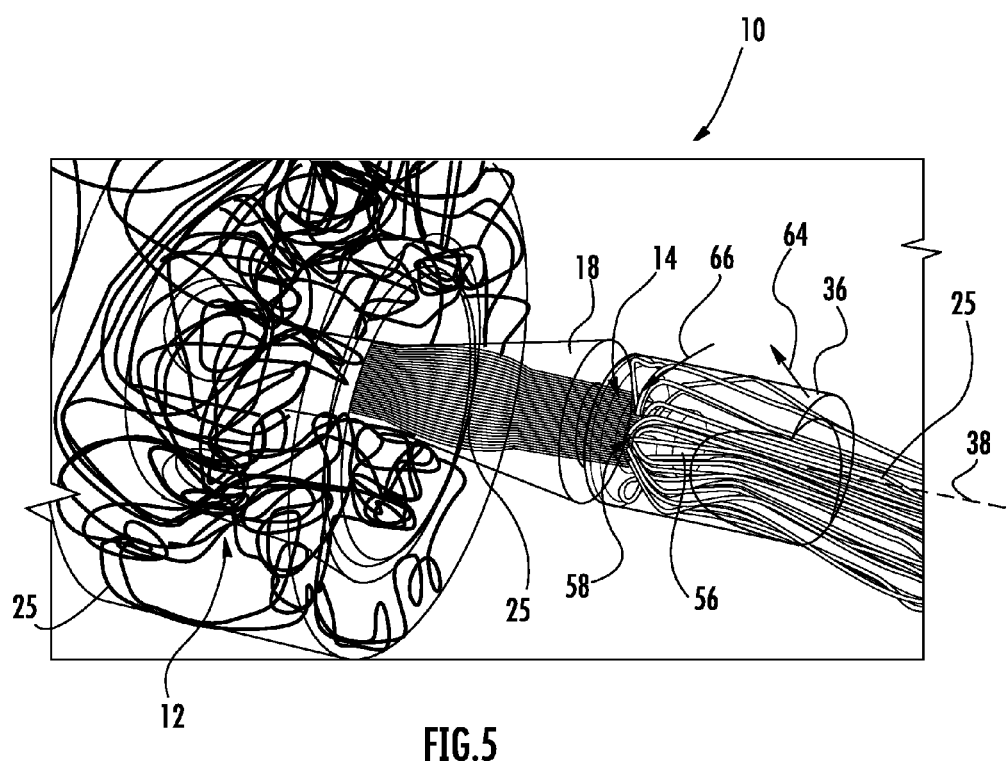
FIG. 5 is a model of fluid flow through the flow disruptor shown in FIGS. 1-4.

In operation, fluid 25 flows axially within fluid line 36 along longitudinal axis 38. As illustrated in FIG. 5, fluid 25 encounters cap surface 56 and is diverted to travel in a non-axial direction shown by arrow 64. Subsequently, in order to flow into PRV 12, fluid 25 is forced to make a second directional change in a non-axial direction shown by arrow 66 (due to the geometry of cap 42). Fluid 25 then flows through apertures 58 into hollow cap 42 and through inner diameter 48. As such, flow disruptor 14 causes directional changes in fluid 25 in non-axial directions 64, 66, which causes turbulence within the fluid flow 25. This results in an increased tangential velocity component (e.g., non-axial flow component) corresponding to a decreased fluid momentum load in axial direction 38, which decreases or eliminates negative droop in PRV 12.

A method of fabricating flow disruptor 14 includes forming base flange 40 having outer diameter 46 and inner diameter 48, and cap 42 extending from base flange 40. Cap 42 is formed with proximal end 50 coupled to base flange 40, distal end 52, and sidewall 54 extending therebetween. At least one aperture 58 is formed in sidewall 54, which may be oriented at an angle 'α' with respect to axial flow of fluid 25. Cap distal end 52 is formed with solid surface 56, which may be oriented substantially perpendicular to axis 38 to cause disruption of fluid 25 flowing in the direction of axis 38. Flow disruptor 14 may subsequently be coupled to PRV 12 or other suitable fluid flow device.

Described herein are systems and method for disrupting fluid flow into a pressure relief valve to reduce negative droop. The described flow disruptor takes on the appearance of a top-hat and includes a cap having features to cause fluid flow to change in at least two, non-axial directions. The fluid flow disruption reduces fluid flow momentum in the axial direction. As such, the flow disruptor allows more control of fluid momentum loads and facilitates tuning of the droop curve without changes to other valve hardware.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A pressure relief valve assembly comprising:
a pressure relief valve configured to couple to a fluid line, the pressure relief valve including a nozzle having an inlet port and a sleeve coupled to the nozzle, the sleeve having an outlet port; and
a fluid flow disruptor coupled to the pressure relief valve, the fluid flow disruptor comprising:
a base flange having an outer diameter and an inner diameter, the base flange coupled to the nozzle of the pressure relief valve; and
a cap extending from the base flange, the cap comprising a proximal end coupled to the base flange about the inner diameter, a distal end, and a sidewall extending between the proximal end and the distal end, wherein at least one aperture is formed in the sidewall,
wherein the fluid flow disruptor is configured to direct a fluid flowing in an axial direction of the fluid line around the cap distal end, transverse to the axial direction through the at least one aperture, along the axial direction through the base flange inner diameter, and along the axial direction through the inlet port, to thereby increase a turbulence of the fluid to decrease an axial momentum load of the fluid acting on the valve.

2. The assembly of claim 1, wherein the cap is cylindrical.

3. The assembly of claim 2, wherein the cap proximal end has a first diameter and the cap distal end has a second diameter, wherein the second diameter is greater than the first diameter.

4. The assembly of claim 1, wherein the cap distal end is flat.

5. The assembly of claim 4, wherein the cap distal end is oriented perpendicularly to an axis of a fluid line.

6. The assembly of claim 1, wherein the at least one aperture is rectangular.

7. The assembly of claim 1, wherein the sidewall is oriented at an angle between the cap proximal end and the cap distal end.

* * * * *